Patented Apr. 21, 1942

2,280,310

UNITED STATES PATENT OFFICE 2,280,310

TREATMENT OF LEATHER

Robert M. Koppenhoefer, Jackson Heights, and Theodore G. Roehner, Malverne, N. Y., assignors to Socony-Vacuum Oil Company, Incorporated, New York, N. Y., a corporation of New York No Drawing. Application October 25, 1940, Serial No. 362,800

3 Claims. (Cl. 149—6)

This invention relates to the fat liquoring of leather and more particularly to the use of a new class of fat liquoring medium for same. The invention includes the composition and process for the manufacture of the fat liquor as well as leather goods containing the fat liquor.

The use of sulphated vegetable and animal oils such as neat's-foot oil, teaseed oil, soybean oil, cod oil, etc., for fat liquoring, has been well known to the art. There are many commercially available grades of palm oil but none of them has been considered suitable for sulfonation and conversion into fat liquors. This is a direct result of the chemical composition of conventional palm oils.

We have discovered that the vinifera palm oil obtainable for instance from French and Belgian Congo, Africa, has outstanding characteristics which make it particularly suitable for the purpose under consideration. The oil deriving from the vinifera palm tree growing in the swamps of the two Congos is known locally as "huile de bamboo" or bamboo oil which obviously is a misnomer.

The vinifera palm oil, or "oil of bamboo" as it is known at its point of origin, is obtained from the *Laurentii* and *Gentiliana raphia* palm trees which grow in enormous forests in the marsh land of the lower Congo in Africa. It should not be confused with the *Elaeis guineensis* palm which is the source of ordinary palm oil.

The fruit of the raphia palm grows in the form of enormous grape-like bunches and shows a layer of orange-yellow pulp, 2-5 mm. thick, between the shell and the kernel. This pulp is rich in oil and is the source of the "bamboo" oil. The picked fruit are piled in heaps for several days and the fermentation which results permits the easy removal of the shell. The pulping is carried out by foot treading in a large receptacle to which water has been added. The kernels can thus be removed and the remaining mass is separated and the oil collected.

The intact fruit of *Gentiliana raphia* palm contains 6.27% oil, obtainable from the pulp, while the pulp contains 31.5% oil. The fruit of the *Laurentii raphia* palm contains 7.52% oil, obtainable from the pulp, while the pulp contains 33.8% oil.

The analysis of these oils from the above trees shows them to be identical and they are not differentiated but referred to as "bamboo oil."

A typical analysis of vinifera palm oil is given below:

Analysis of vinifera palm oil

| | |
|---|---|
| Iodine value | 79.5 |
| Acid value | 11.5 |
| Free fatty acids (as oleic acid) % | 5.4 |
| Saponification value | 198.7 |
| Unsaponifiable matter % | 3.9 |
| Separated fatty acids % | 93.1 |
| Mean molecular weight | 294.0 |
| Iodine value | 82.0 |
| Melting point °C | 36.7 |
| Liquid fatty acids % | 55.5 |
| Mean molecular weight | 307.0 |
| Iodine value | 129.0 |
| Thiocyanogen value | 86.8 |
| Hexabromide value | 0.0 |
| Acetyl value | 25.0 |
| Solid fatty acids % | 45.4 |
| Mean molecular weight | 273.9 |
| Iodine value | 14.0 |
| Melting point °C | 51.4 |

The above analysis may be interpreted in terms of fatty acid composition as follows:

| | Per cent by weight |
|---|---|
| Oleic acid | 30.1 |
| Linoleic acid | 27.7 |
| Palmitic acid | 15.2 |
| Stearic acid | 27.0 |

However, the above data are given only as an example and for broadly definitive purposes we give below a range within which the fatty acid composition of vinifera palm oil may vary.

| | Per cent by weight |
|---|---|
| Oleic acid | 28–33 |
| Linoleic acid | 25–30 |
| Palmitic acid | 13–17 |
| Stearic acid | 25–30 |

In computing the percentages of the above acids, the actual presence of minute quantities of other acids of a similar nature has been ignored. The data show the wide range in the character of the fatty acids from saturated acids to fatty acids with two coordinated double bonds as linoleic acids—all being present in considerable quantity. A survey of the composition of available commercial oils presently used in the preparation of fat liquors will show that this oil possesses a composition distinctive from any of them. The outstanding value of the vinifera palm oil lies in its peculiar composition. It is high in saturated acids and at the same time it contains an appreciable amount of linoleic acid so that the actual spread of the type of fatty acids greatly exceeds that of the common commercial oils.

The following will exemplify the process for sulphation of the vinifera palm oil.

To 50 parts of vinifera palm oil in a suitable glass or lead lined container, 10 parts of concentrated sulfuric acid (sp. g.—1.84 of 94–96% $H_2SO_4$) are slowly added over a period of at least 3 hours. The container must be equipped such that the temperature of the oil during the addition of the sulfuric acid does not rise above 95° F. and such equipment as is necessary for the constant and thorough agitation of the oil during the sulphation period must also be available. Agitation should be continued for at least an hour after the final addition of the sulfuric acid.

To the acid-oil mixture, a prepared and cool (room temperature) solution containing 5.75 parts of sodium hydroxide dissolved in 32 parts of water is slowly added with vigorous agitation. During the addition of the alkali solution, the temperature should be maintained below 100° F. The oil mixture is permitted to stand overnight and the separated aqueous phase is drawn off. At this point, the oil should be slightly acid to methyl orange. If the separation of the aqueous phase is incomplete on the second day, it can be accelerated by warming the oil to about 120° F. Any subsequent washing would depend on the individual characteristics required in the oil.

The further addition of sodium hydroxide solution or ammonia, with agitation, is necessary to bring the oil to the desired pH of about 5.5.

*Analysis of sulphated vinifera palm oil*

| | |
|---|---|
| Water, % | 13.0 |
| Ash, % | 8.42 |
| Combined $SO_3$, % | 3.50 |
| Total fatty matter, % | 76.7 |
| Combined and free fatty acids, % | 34.2 |
| Iodine value of total fatty matter | 47.9 |
| pH (1—10 emulsion) | 5.5 |
| Emulsion (1—10 at 120° F. at pH—2) | Almost transparent |
| Emulsion (1—10 at 120° F. at pH—6) | Excellent |

It will be clear to anyone familiar with the art that the sulphated vinifera palm oil is a satisfactory product for fat liquoring purposes. It can be further blended with other fatty oils or mineral oils to produce fat liquors of adequate emulsive and other characteristics.

Sulphated vinifera palm oil possesses certain characteristics which make it a particularly desirable oil for the fat liquoring of leather. The presence of linoleic acid in fairly high quantities and of oleic acid gives the sulphated oil capacity to confer to the leather the same properties of fullness and mellowness which are obtained with sulphated cod oil while the presence of a fairly high proportion of saturated acids produces a lubricating capacity similar to that obtained with sulphated neat's-foot oil. These characteristics are of particular value in certain types of leather, such as split leather in which it can be used in large quantities with very desirable results. When used in smaller quantities on calf and sheep leathers, equally desirable characteristics are obtained with this oil.

An example of its application to leather manufacture may be cited. To 100 parts of wet, shaved chromed tanned leather which has been adequately neutralized and washed, a solution containing 18 parts of sulphated vinifera palm oil dissolved in 200 parts of water at 120° F. is added in a rotating drum. The leather is milled for one hour at 120° F. in this solution after which it is removed, and permitted to dry either in the atmosphere or in a heated drum. If the former is the case, the leather must be subsequently subjected to mechanical flexing to loosen the fibre structure. The following data relating to such a process were obtained on an experimental laboratory run.

| | | |
|---|---|---|
| Wet weight of leather | grams | 115 |
| Weight sulphated vinifera palm oil | do | 17.8 |
| Weight water | do | 230.0 |
| Initial pH of fat liquor | | 5.5 |
| Final pH of exhaust liquor | | 4.7 |
| Per cent of oil taken up by leather | | 98.7 |

The finished leather possessed a very excellent clean gray color while its soft feel, freedom from raspiness and apparent excellent lubrication were very pronounced.

Under controlled conditions of temperature and humidity the oil both in the raw and sulphated form was subjected to oxidation at 212° F. Other common oils were simultaneously studied and they can be rated in the following order of increasing capacity for oxidation.

Sulphated neat's-foot oil
Sulphated vinifera palm oil
Sulphated teaseed oil
Raw neat's-foot oil
Sulphated soya bean oil
Raw vinifera palm oil
Sulphated cod oil
Sulphated rice bran oil
Raw cod oil
Raw rice bran oil These data demonstrate the suitability of sulphated vinifera palm oil as a lubricant for leather to be applied in fat liquoring.

This sulphated vinifera palm oil may also be used in admixture with other oils and sulphated oils for fat liquoring, stuffing and the like. For example, in fat liquoring it may be used in admixture with sulphated sperm oil and other sulphated animal and vegetable oils, as well as with certain mineral oil sulphonic derivatives. In certain circumstances these oil mixtures may have raw oils, such as animal and vegetable oils and certain mineral oils added to them, as is known in the art. In all such circumstances, the excellent qualities of the vinifera palm oil are conferred upon the product.

In general, for fat liquoring, the excellent emulsifying qualities of the vinifera palm oil render the use of other emulsifiers relatively unnecessary since it is able to carry considerable quantities of raw oils into proper emulsified condition. When it is desirable to use added emulsifiers, any of these commonly used in the art are compatible and will be found useful.

In stuffing, raw vinifera palm oil may be used, alone for some types of work, but usually in admixture in varying amounts with the other oils used in such circumstances, and will be found to be a highly desirable ingredient in such uses, because of its unusual composition and characteristics.

We claim:

1. A method of lubricating skins and leathers comprising impregnating them with a product containing a lubricant element selected from the group consisting of vinifera palm oil and sulphated vinifera palm oil.

2. A method of fat liquoring skins and leathers comprising applying thereto an aqueous emulsion containing sulphated vinifera palm oil.

3. A method of stuffing skins and leathers comprising impregnating such skins and leathers with a non-aqueous mixture containing vinifera palm oil.

ROBERT M. KOPPENHOEFER.
THEODORE G. ROEHNER.